US008150547B2

(12) United States Patent
Wojdyla et al.

(10) Patent No.: US 8,150,547 B2
(45) Date of Patent: Apr. 3, 2012

(54) METHOD AND SYSTEM TO PROVIDE ADDRESS SERVICES WITH A DOCUMENT PROCESSING SYSTEM

(75) Inventors: Richard Wojdyla, Wadsworth, IL (US); Walter S. Conard, Lake Villa, IL (US)

(73) Assignee: Bell and Howell, LLC., Durham, NC (US)

( * ) Notice: Subject to any disclaimer, the term of this patent is extended or adjusted under 35 U.S.C. 154(b) by 964 days.

(21) Appl. No.: 12/003,274

(22) Filed: Dec. 21, 2007

(65) Prior Publication Data

US 2009/0159509 A1 Jun. 25, 2009

(51) Int. Cl.
*B07C 5/00* (2006.01)
*B07C 3/14* (2006.01)
*G06F 7/00* (2006.01)
*G05B 9/02* (2006.01)

(52) U.S. Cl. .......... 700/227; 700/220; 700/226; 700/79; 209/584; 209/900

(58) Field of Classification Search ........................ None
See application file for complete search history.

(56) References Cited

U.S. PATENT DOCUMENTS 5,422,821 A 6/1995 Allen et al.
5,703,783 A * 12/1997 Allen et al. .................. 700/213
6,610,955 B2 8/2003 Lopez
6,791,050 B2 * 9/2004 Daniels et al. ................ 209/584
7,258,277 B2 * 8/2007 Baker et al. .................... 235/385
7,792,683 B2 * 9/2010 Sipe et al. ....................... 705/1.1
2004/0032986 A1 * 2/2004 Snapp ........................... 382/217
2006/0276916 A1 * 12/2006 Dearing et al. ................. 700/79
2009/0057207 A1 * 3/2009 Orbke et al. ................. 209/584

OTHER PUBLICATIONS

U.S. Appl. No. 11/892,581, filed Aug. 24, 2007, Orbke.
U.S. Appl. No. 11/848,136, filed Aug. 30, 2007, Orbke.

* cited by examiner

*Primary Examiner* — Gene Crawford
*Assistant Examiner* — Yolanda Cumbess
(74) *Attorney, Agent, or Firm* — McDermott Will & Emery LLP

(57) ABSTRACT

A method and system are provided for updating address information and using document processing equipment to print delivery point information, including a barcode or readable text, on mail pieces. The address data is processed and updated by a service provider or by an address service provider. When the mailpieces are processed on document processing equipment, the printed address data is compared with an updated address data record to retrieve the updated address and apply the correct delivery point information. The delivery point information representing the most current and accurate address for the addressee of the mail piece.

21 Claims, 10 Drawing Sheets

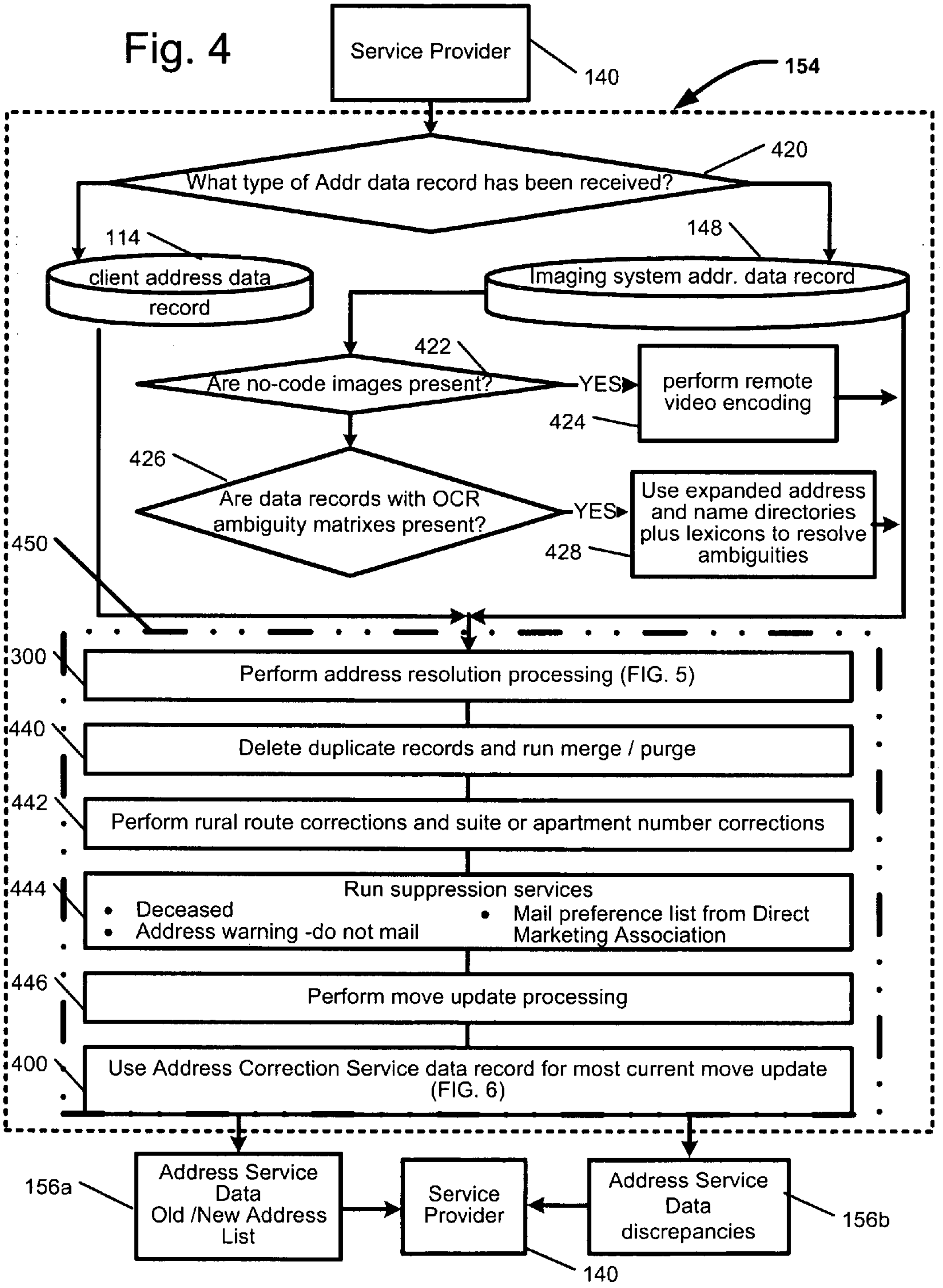
Fig. 4
Service Provider
140
154
420
What type of Addr data record has been received?
114
client address data record
148
Imaging system addr. data record
422
Are no-code images present?
YES
perform remote video encoding
424
426
Are data records with OCR ambiguity matrixes present?
YES
Use expanded address and name directories plus lexicons to resolve ambiguities
428
450
300
Perform address resolution processing (FIG. 5)
440
Delete duplicate records and run merge / purge
442
Perform rural route corrections and suite or apartment number corrections
444
Run suppression services
Deceased
Address warning -do not mail
Mail preference list from Direct Marketing Association
446
Perform move update processing
400
Use Address Correction Service data record for most current move update (FIG. 6)
156a
Address Service Data Old /New Address List
Service Provider
Address Service Data discrepancies
156b
140

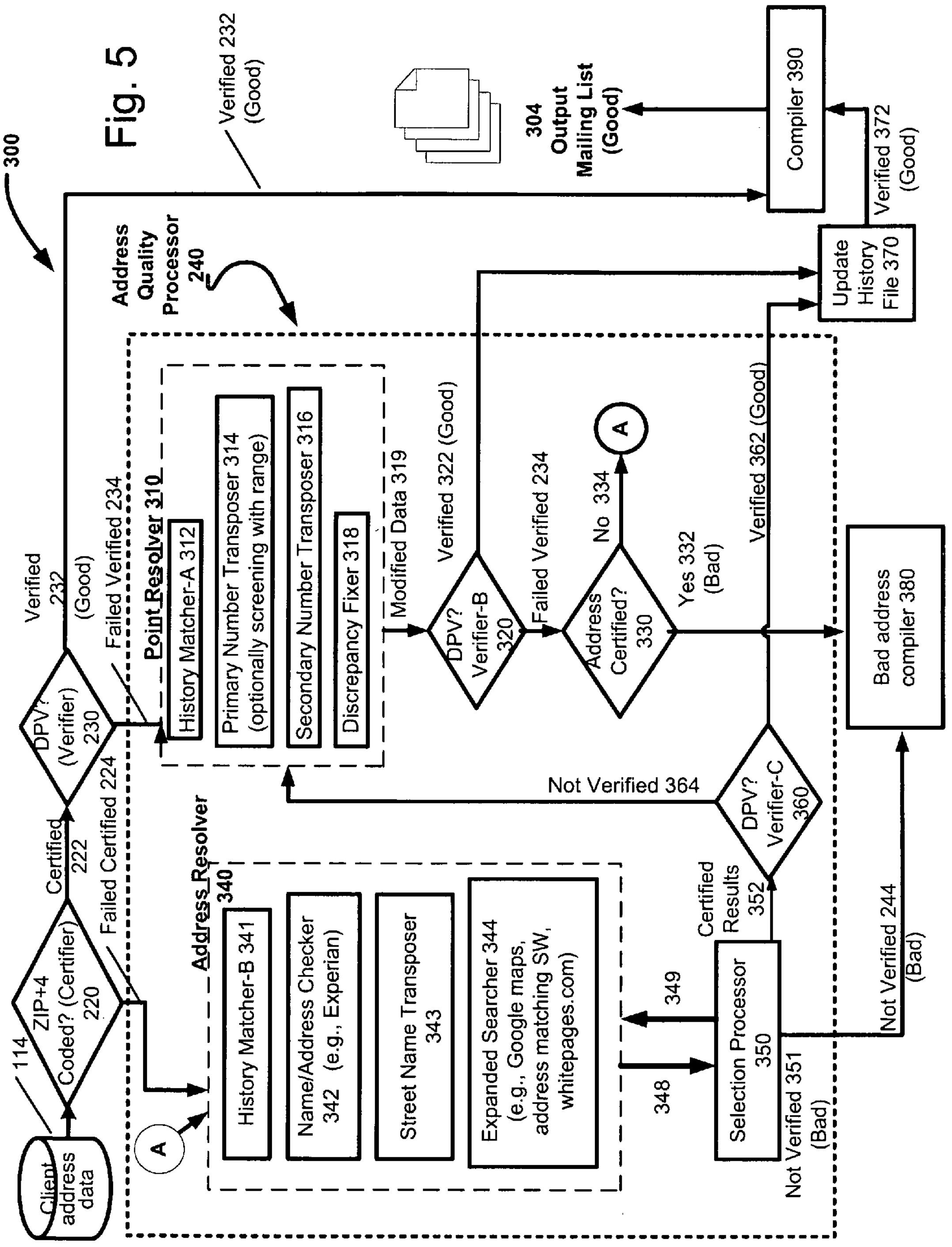
300
Fig. 5
Client address data
114
ZIP+4 Coded? (Certifier) 220
Certified 222
Failed Certified 224
DPV? (Verifier) 230
Verified 232 (Good)
Failed Verified 234
Address Quality Processor 240
Point Resolver 310
History Matcher-A 312
Primary Number Transposer 314 (optionally screening with range)
Secondary Number Transposer 316
Discrepancy Fixer 318
Modified Data 319
DPV? Verifier-B 320
Verified 322 (Good)
Failed Verified 234
Address Certified? 330
No 334
Yes 332 (Bad)
A
Address Resolver 340
History Matcher-B 341
Name/Address Checker 342 (e.g., Experian)
Street Name Transposer 343
Expanded Searcher 344 (e.g., Google maps, address matching SW, whitepages.com)
348
349
Selection Processor 350
Not Verified 351 (Bad)
Certified Results 352
DPV? Verifier-C 360
Not Verified 364
Verified 362 (Good)
Not Verified 244 (Bad)
Bad address compiler 380
Update History File 370
Verified 372 (Good)
Compiler 390
304 Output Mailing List (Good)
Verified 232 (Good)

42

| Type | Field | Digits | |
|---|---|---|---|
| Tracking Code | Barcode Identifer | 2 | 44 |
| | Service Type Identifer | 3 | 46 |
| | Mailer ID | 6 | 48 |
| | Unique Identifier (unique number and / or ACS match back code) | 9 | 50 |
| Routing Code | Delivery Point Address Code | 0, 5, 9, or 11 | 52 |

Fig. 7

METHOD AND SYSTEM TO PROVIDE ADDRESS SERVICES WITH A DOCUMENT PROCESSING SYSTEM

TECHNICAL FIELD

The present subject matter relates to techniques and equipment to update address information and use mail processing equipment to print delivery point barcodes that represent the most current and accurate address for the addressee.

BACKGROUND

Postal authorities are continuously seeking ways to improve address maintenance services for address quality so that move updates are reduced and so that less mail, which is processed by the postal authority, is undeliverable as addressed. Re-routing mail for delivery to a corrected address and updating address information costs the postal authority significant expense and reduces the standard of delivery for accuracy and time. Clients that use the mail for communication also want to reduce the same errors in addresses since they want fast delivery and want to minimize the number of pieces that are not deliverable causing a loss in the cost of the mailpiece and the postage. Currently the problems with the address information need to be corrected in the client's address list before the mailpiece is manufactured. This requires many complex processes using a variety of software address quality and address correction products. Often this means a major expense in Information Technology (IT) equipment and software changes plus operators to implement new processes within the IT department. The net result is that many clients do not make the changes needed to stay current with postal authority rules and the constantly changing address quality and move information.

Hence a need exists for accomplishing the address data maintenance services using a document processing system, such as a sorter, a scanner, a copier or an inserter with an imaging system and printer.

SUMMARY

It is desirable to provide a method for updating address data for a plurality of mailpieces processed by a document processing system prior to delivery by a postal authority. The method includes using an address list at a document service provider, wherein the address list is associated with a grouping of mailpieces associated with a client. At least some of the address data contained in the address list is updated for compliance with one or more regulations of the postal authority or any requirement of the client. The updated address list is converted into a format required by an imaging system associated with the document processing system and the converted address list is stored onto the document processing system. The mailpieces are processed on the document processing system and an image of an address positioned on each mailpiece is captured by the imaging system. The information from the captured image of each mailpiece is compared with the stored address list and delivery information approved by the postal authority is printed on mailpieces requiring an address update as indicated by the comparing of information to updated client address data.

It is also desirable to provide a system for updating address data for a plurality of mailpieces. The system includes a client address list having address data associated with each mailpiece and an address maintenance service which is able to receive the client address list and update the address data contained in the client address list. The system includes a document processing system having an image capturing system associated with the document processing system. The image capturing system is capable of capturing information from an image of an address positioned on each mailpiece processed by the document processing system; and comparing the captured image of each mailpiece with any corresponding updated client address data received from the address maintenance service. A printer is provided to print corrected address delivery information on each mailpiece requiring an address update as indicated by the comparing of information to updated client address data.

Another object is to provide a method for updating address data for a plurality of mailpieces processed by a document processing system prior to delivery by a postal authority. The method includes storing an updated address list onto a document processing system and processing the mailpieces on the document processing system. An image of an address positioned on each mailpiece is captured by the image capturing system and compared with the stored updated address list. Delivery information approved by the postal authority is printed on the mailpieces requiring an address update as indicated by the comparing of information to updated client address data.

It is a further objective to provide a system for updating address data for a plurality of mailpieces. The system includes a document processing system with an image capturing system and an address maintenance service adapted to receive a client address list and update the address data contained in the client address list. The image capturing system is capable of capturing an image of an address positioned on each mailpiece processed by the document processing system; and comparing the captured image of each mailpiece with any corresponding updated client address data received from the address maintenance service by the document processing system. A printer is provided for printing corrected address delivery information on each mailpiece requiring an address update as indicated by the comparing of information to updated client address data.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is an exemplary flow chart depicting the functions performed the address service provider.

FIG. 5 is an exemplary flowchart depicting an address resolution system comprising an address resolver and a point resolver of an address resolution system.

FIG. 7 is an exemplary data structure for an intelligent mail barcode (IMB).

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present teachings.

Business entities that form a part of the address maintenance service performed on mail processing equipment are given numerous titles by those familiar with the postal service. For the purpose of this illustration, a client is the business entity that wishes to communicate with customers to achieve some business objective. The client usually maintains the integrity and accuracy of their customer address lists; although some clients may choose to contract for the address maintenance service. The client may be a department within a service provider's business such as but not limited to a financial institution or insurance company. As an example, the financial institution may perform all mail production operations within their operations and hence they are a service provider, but they may also have numerous clients such as different credit cards each with their own customer list. The service provider 140 is the business entity, generally hired by the client to prepare the mail for delivery to the postal authority. The contracted services may include, but are not limited to, document preparation, printing, inserting, and sorting. The client may choose to keep one or more of these functions in-house based on their business model, for security reasons, or for any other suitable reason. In addition, the service provider may be contracted for address list maintenance, or an address service provider may be used, which specializes in address processing.

Figure 1:
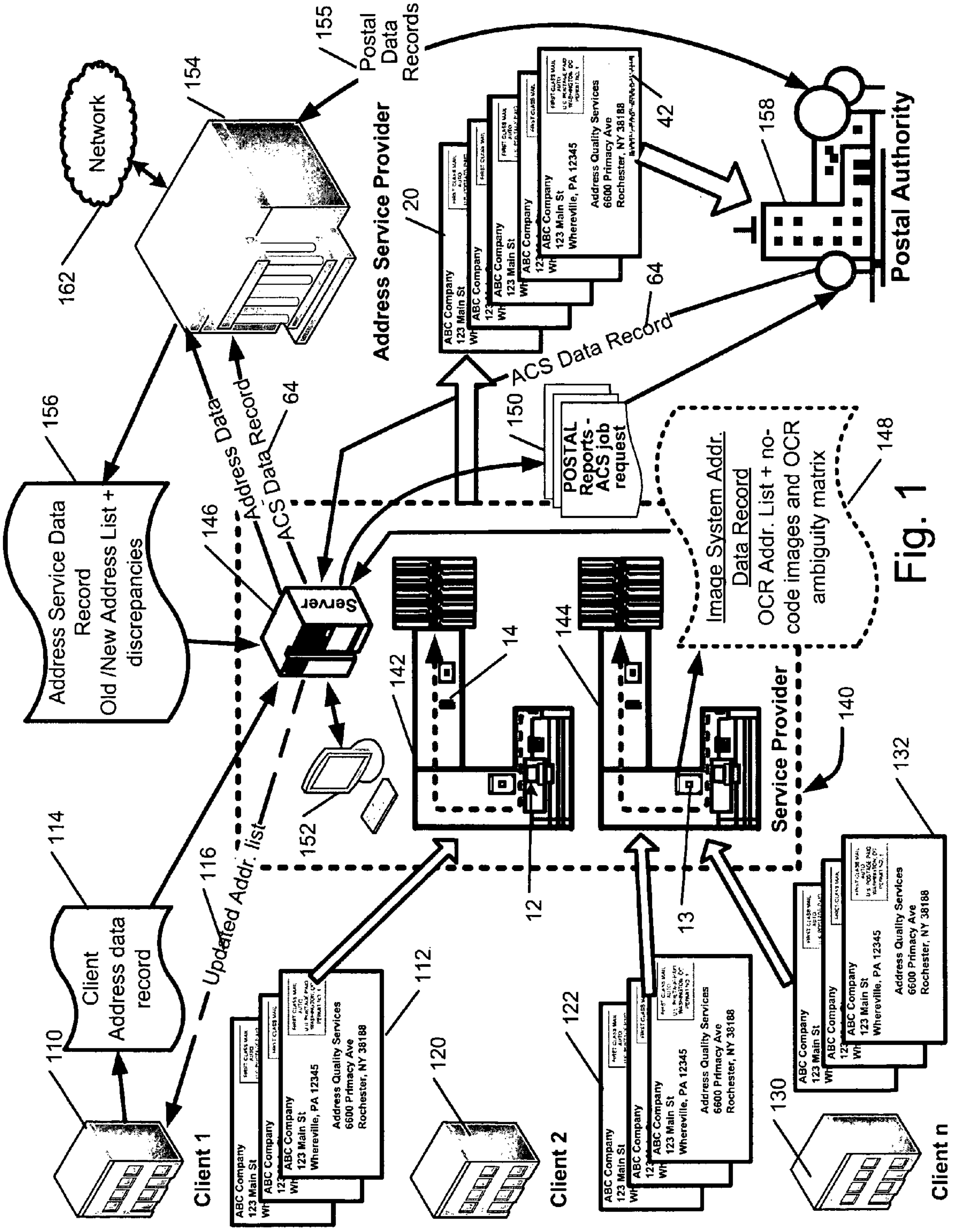
FIG. 1 is an illustration of the components that may be used to provide address services on mail processing equipment using sorters.

Reference now is made in detail to the examples illustrated in the accompanying drawings and discussed below. FIG. 1 illustrates exemplary components that may provide address services on mail processing equipment. An imaging system 13 is a part of the system that is used to perform the address update process on a document processing system. Although numerous configurations of an imagining system 13 can be used, the exemplary imaging system 13 referenced herein contains an image capture device, an image processing system, Optical Character Recognition (OCR) technology, and a directory and lexicon lookup system to resolve OCR ambiguities. The imaging system 13 includes the computer hardware processing and associated software configuration for executing these functions. Those skilled in the art often refer to this process as reading the address on a mailpiece or document. As discussed more below, the imaging system may also be configured to obtain a postal authority approved address and an addressee name based on information captured from the mailpiece.

Four major entities are involved in the process to update address data on a mail processor in our example. Number one is the group of clients 1 thru n (110, 120, 130) that have a communication requirement to customers. These clients have chosen the postal authority 158 to deliver the information to the customer in the form of mailpieces 112, 122, 132. Some clients 110 have chosen to maintain their address database by using a service provider 140 to provide them with updated address list information 116. They could have purchased the needed software modules and software maintenance agreement (the databases used by address updating software change every month), however this approach requires IT changes and personnel to run the system. If this activity is not one of their core competencies, subcontracting this work is the preferred approach. Regardless of how the address list of customers is maintained, the list is used to create the address on each of the mailpieces either by showing the address through a window in the envelope or by printing the address on the envelope. As alluded to above, the quality and accuracy of the address list probably is defective unless a robust address maintenance system was used. Hence the clients typically have a critical requirement to make corrections to the address data on the envelope after the mailpiece has been created.

Figure 8:
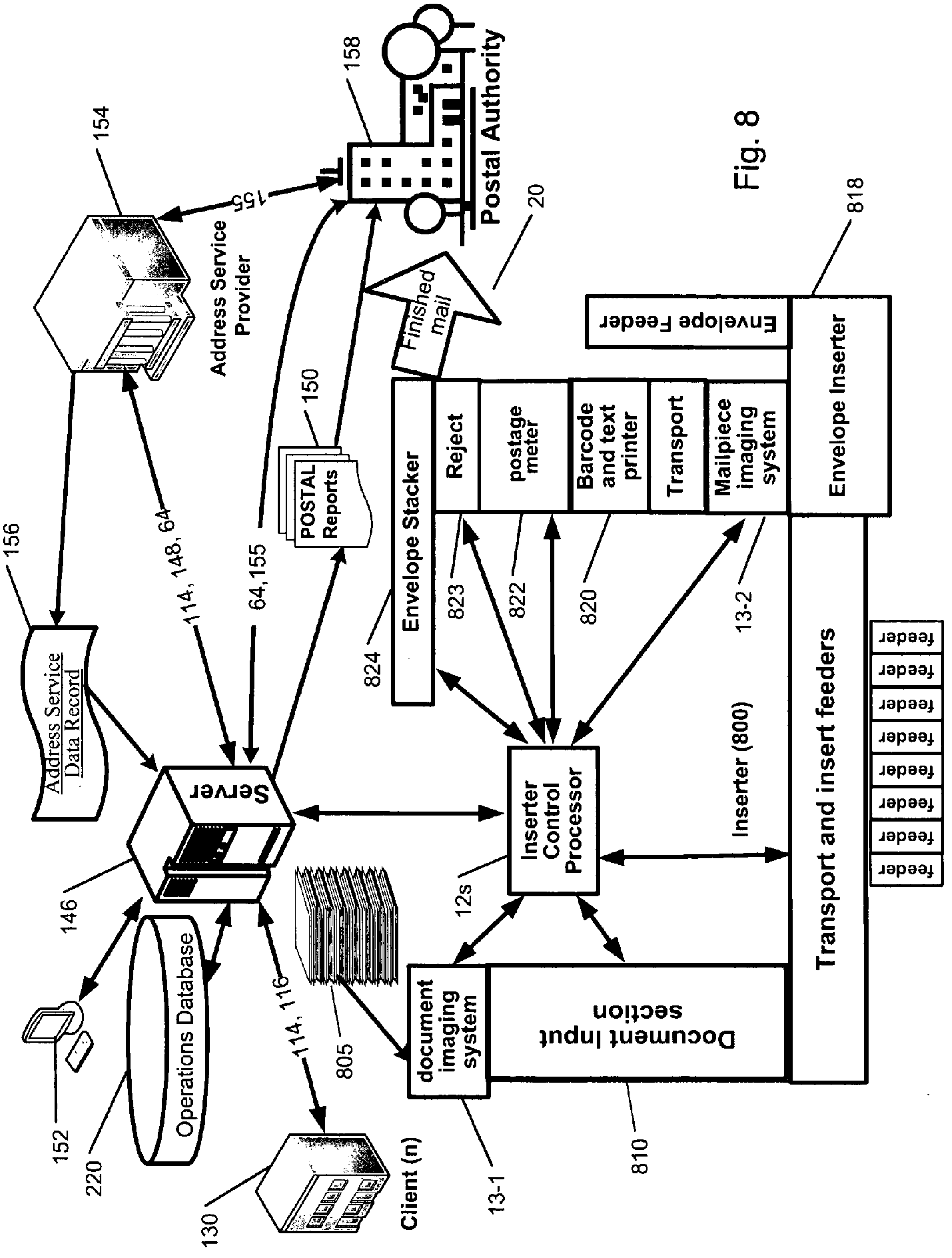
FIG. 8 is an illustration of components providing address services on mail processing equipment using inserters.

The number two entity is the service provider 140, who will correct the address deficiencies on the mailpieces. Although not shown in FIG. 1, the service provider may provide printing and inserting services in addition to the newly disclosed address maintenance process which uses mail sorters 142, 144 and data processing technology to correct address deficiencies on the mailpieces in this first example. The service provider may have multiple sorters 142, 144 each allocated to perform different sorting operations. The clients will often allocate different sorters with different sort schemes based on the volume of mail to be processed and the expected groupings of destination delivery points needed to earn postage discounts. In FIG. 1, sorter 142 is dedicated to processing client mail for which an address data record 114 was received in advance of the physical mail 112. The client address data record 114 will be processed by the address service provider 154 for address maintenance services and the address service data record 156 will be returned before the mail is processed on sorter 142. FIG. 8 depicts a similar process using an inserter.

The address data is processed and updated by a service provider or by an address service provider. When the mailpieces are processed on the sorter or inserter the printed address data is compared to the updated address data record to retrieve the updated address and apply the correct delivery point barcode. This enables the client to deliver mailpieces to the postal authority with corrected address data without having to perform these services using their IT department.

The second sorter 144 is dedicated to process client mail for which no client address data record 114 is available in advance. The exemplary address maintenance service involves two steps before addresses can be updated on the mailpieces 122, 132 during the sorting operation. The first step uses the sorter imaging system 13 to collect an image system address data record 148 that will be forwarded by the server 146 to the address service provider 154 for address maintenance processing. The address service data record 156 is returned for use on sorter 144 the next time the client presents the same mailing (i.e. next month's credit card bill). In addition, the address service data record 156 may be used for a given client if a later mailing to the same customer address database 18 is generated and provided to the service provider 140. An example would be a credit card statement followed by an advertisement mailing or a privacy statement mailing. Those skilled in the art will identify additional mailings that are qualified to use the address service data record 156 which is associated with a given client's customer address database 18. The output of the service provider 140 function is mail 20 that has updated addresses based on the address maintenance service, ACS job request 150, confirm request, mailer ID, a unique identifier or matchback code (as required) and has been pre-sorted based on postal authority rules. The necessary information has been encoded in the postal authority Intelligent Mail Barcode (IMB) 42 or in the delivery point barcode, Planet code, key line or endorsement lines as required by postal authority standards. Referring to FIG. 2*b*, the barcodes 42 and/or updated address text 43 has been printed on the mailpiece before delivery to the postal authority by the mail processing equipment. The service provider 140 provides the necessary postal reports 150 either hard copy or electronically to the postal authority 158 to describe the mailing 20 that is submitted for delivery. An ACS job request and other communication may be provided as part of the Postal reports 150.

Figure 6:
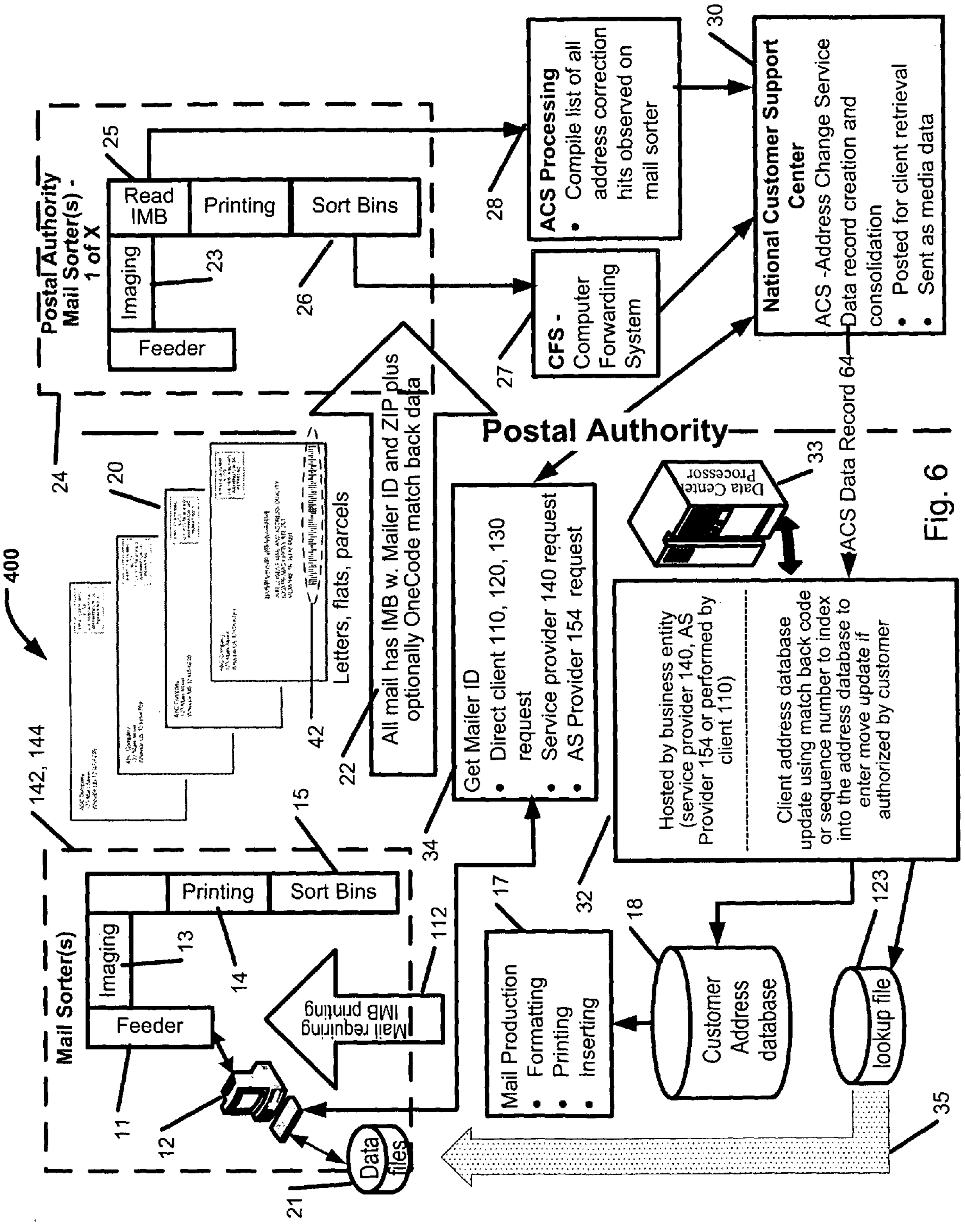
FIG. 6 is an illustration of an address change service as provided by a service provider and a postal authority.

The service provider 140 may have numerous computers to perform the various functions that are necessary. If multiple sorters are used a server 146 is used to manage data and provide an operator interface 152 to setup parameters associated with the clients and with sorter operations (sort schemes, mailing characteristics, etc.). Each sorter has computers 12 associated with its operation. Numerous computers are frequently used to control run time operations, sorter management and image processing. The sorter operations may require running Address Change Service (ACS) to request that the postal authority provide move update data for all mailpieces where an addressee has moved and registered the move with the postal authority. FIG. 6 provides the details on ACS as it is integrated into sorter operations and FIGS. 2, 3*a* and 3*b* provide additional detail associated with the service provider 140.

The number three entity is the address service provider 154. The address service provider 154 is a separate operation and may be connected to the service provider 140 with an internet connection or with a dedicated broadband connection. The address maintenance functions that are necessary to improve address quality, enhance deliverability, update for moves and correct for changes in the address list content are all performed by the address service provider 154. The address service provider 154 receives client address data records 114 and image system address data records 148 from numerous clients which are routed through the service provider 140. The address service provider 154 receives data 155 from the postal authority 158. Data 155 is needed to keep the data directories current for moves, delivery points, suite numbers and national address data, to highlight a few of the data transfers. Other data needed for additional address maintenance services is received over the network 162 from phone directory sources, credit bureaus and geographic data providers. Additional sources of name and address data will be added as the address maintenance process evolves. Additional detail on the address service provider 154 process steps is depicted in FIG. 4. Having one centralized site for the address service provider 154 to provide service to numerous service providers 140 is the most efficient and cost effective solution. Advances in address maintenance services and the frequent data updates only need to be done once and with a dedicated team. However, most of the address service provider functions can be purchased as software products with subscriptions for the necessary databases. This would allow a service provider 140 to offer the address maintenance services without access to the address service provider 154.

The number four entity is the postal authority 158 such as the United States Postal Authority (USPS®). The postal authority 158 processes and delivers the mail 20 and provides many of the critical data records 155 needed to keep the address maintenance service current with the most recent address records, move data, and postal rules. Some of these data records include ACS data records 64 for individual clients as identified with the mailer ID. The ACS data records 64 contain move update data which was determined when an individual mailpiece was processed on postal sorting equipment. ACS has to have been selected for the mailpiece and details of this selection are found in FIG. 6.

Figure 2A:
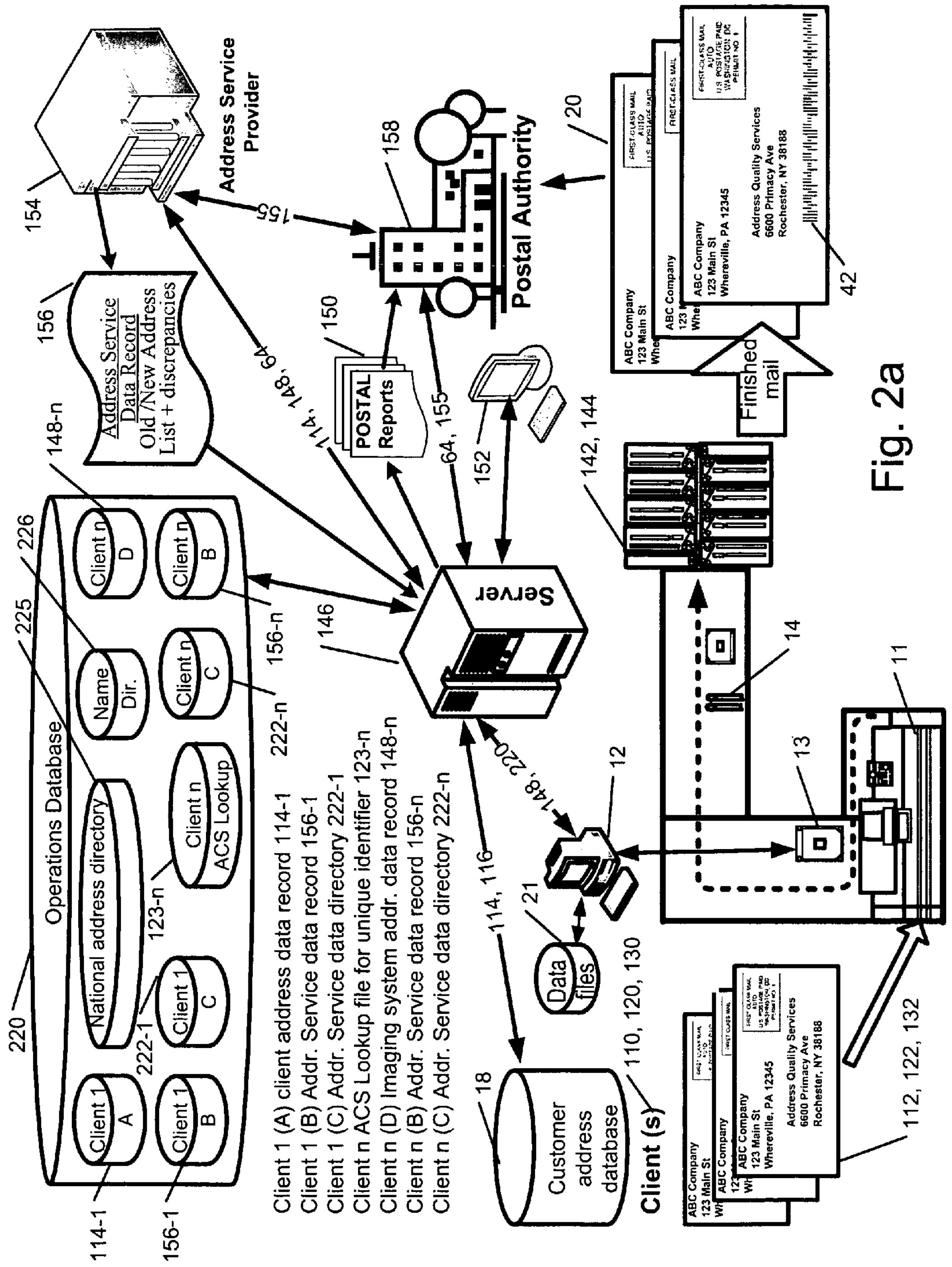
FIG. 2*a* is an illustration of the processes performed and an illustration of the data structure used by a service provider to provide address services on mail processing equipment.
Figure 2B:
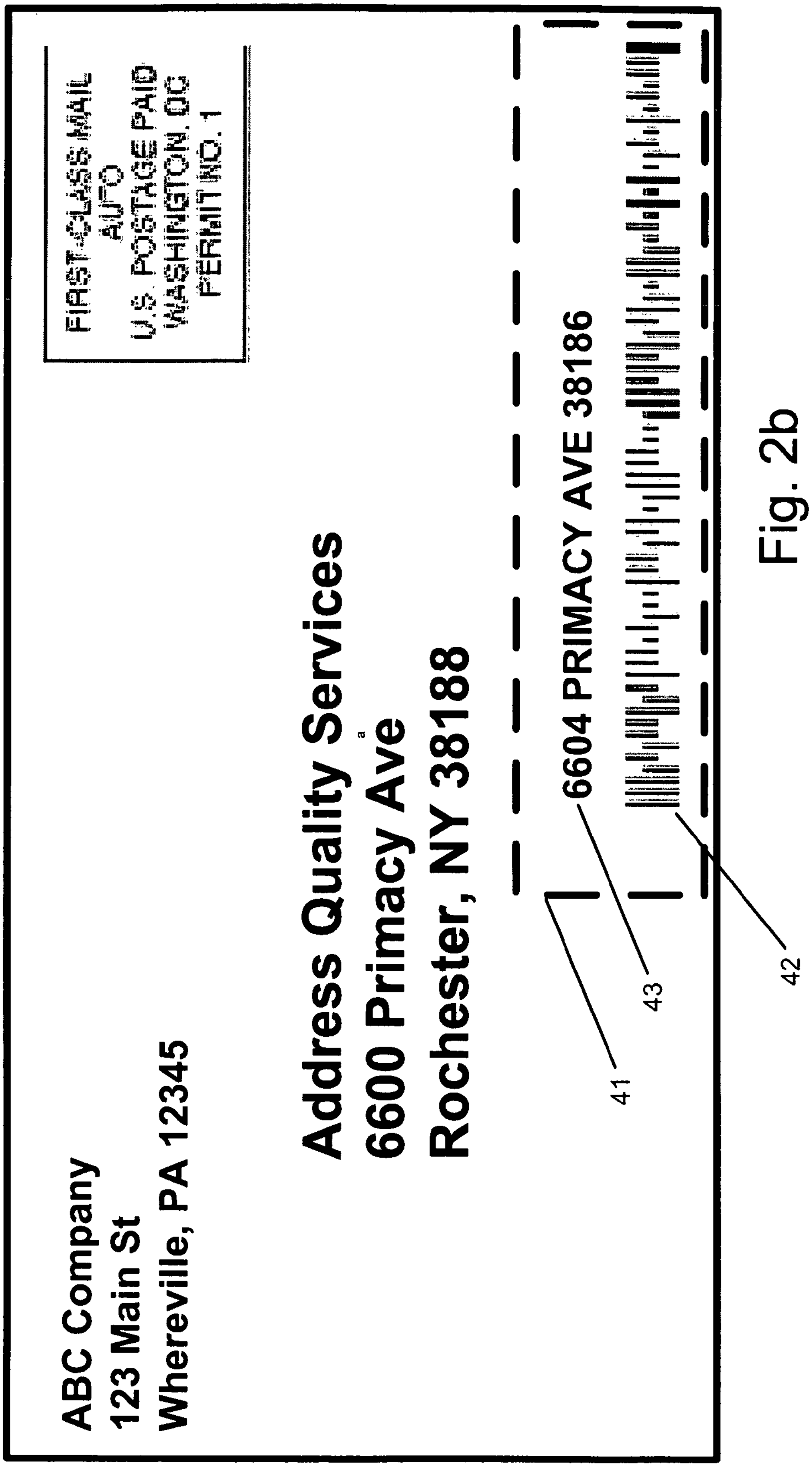
FIG. 2*b* is an exemplary mailpiece that has received a delivery point update and a resulting 5 digit ZIPCODE change as the result of the address services.
Figure 3A:
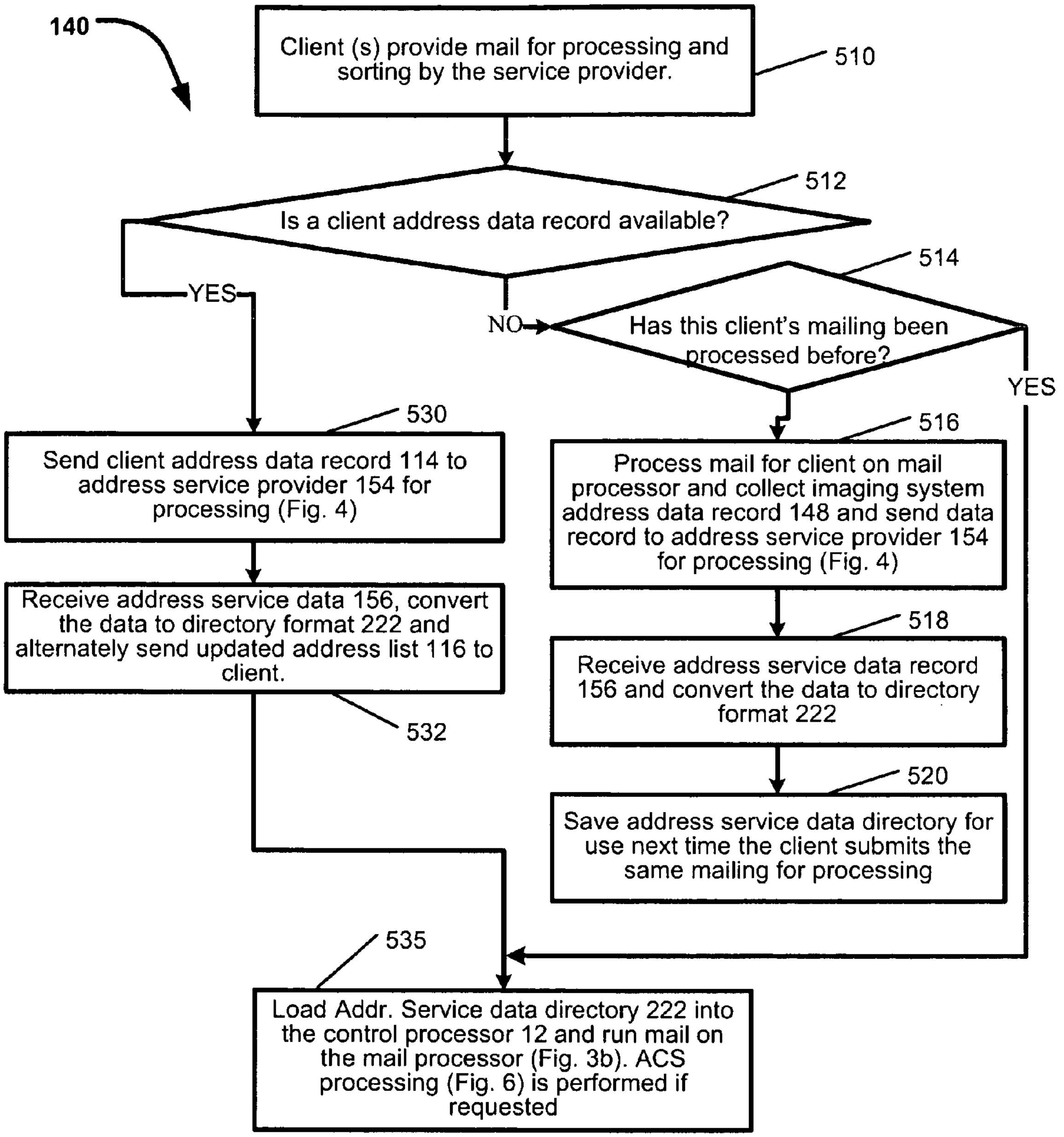
FIG. 3*a* is an exemplary flow chart depicting the functions performed by the service provider.
Figure 3B:
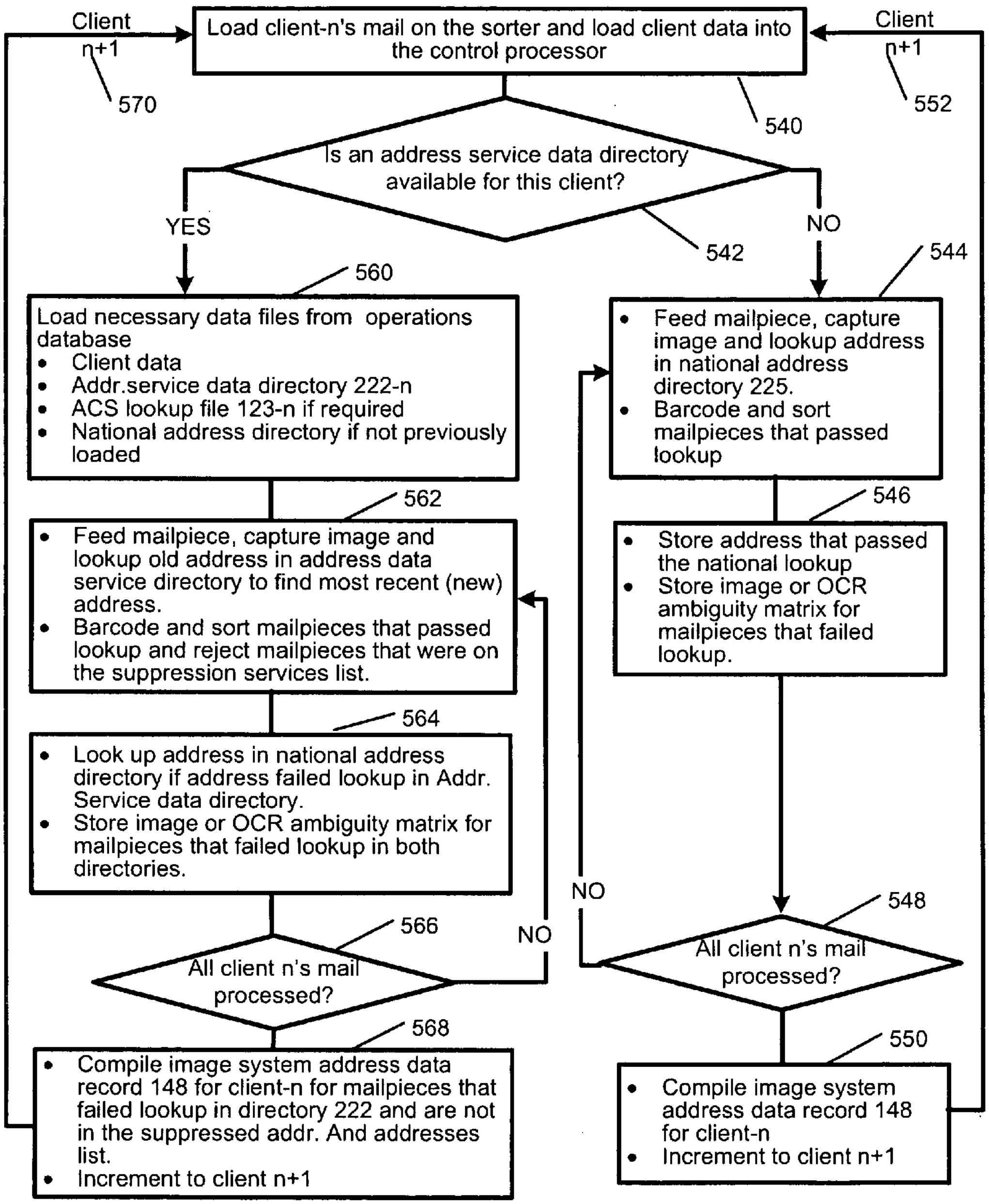
FIG. 3*b* is an exemplary flow chart depicting the functions performed by a mail sorter to update address data and print the correct delivery point barcode.

Reference is now made to FIGS. 2*a*, 2*b*, 3*a* and 3*b* for a more detailed explanation of the service provider 140 operations. FIG. 2*a* focuses on the data structure associated with the operation of the address maintenance services on mail processing equipment. Many of the elements of FIG. 1 are repeated for easier reference. FIG. 3*a* is an exemplary flow chart of the data setup needed to perform the address maintenance service and FIG. 3*b* is an exemplary flow chart of the address services on a sorter. Referring to FIG. 2*a*, an operations database 220 is maintained for numerous data types and for each client 1 thru n. Some clients will provide client address data records 114 that are extracted from their customer address database 18.

Other clients will give permission for the service provider 140 to extract an address list using the image system 13 when the mail is run on the sorter 144. The image system address data record 148 is created for the client mailing that is being processed. This data record contains the results of each name and address that was read by the image system 13 from the mailpiece image and validated against the national address directory 225 which was generated from postal authority data records 155. Addressee recognition may require the use of either and national name directory or a name directory customized for a given client 226. In addition, the image system address data record 148 will contain an image of the mailpiece, if the address and name were not read, which can be used with remote video encoding (RVE) at the address service provider 154 location. Computer terminal operators will key in the address and addressee data from the image and use computer assistance to identify the addressee and address. Alternately, the ambiguity matrix that is returned from the Optical Character Reader (OCR) for incomplete reads is included in the data record for those cases where the address service provider's processes can resolve the ambiguity using enhanced processes and lexicons. An ambiguity matrix occurs when the OCR can not distinguish characters such as 8 and B or C and G, etc. An alternative to the ambiguity matrix is for the OCR to return multiple potential results with confidence factors attached to each response. For example the actual name of Mark Gordon may be returned from the OCR as Nark Gordon or Mark Corden or other combinations to be resolved by the address service provider 154. The address service provider 154 may use a national name directory or a name directory 226 (FIG. 2*a*) customized for a given client to resolve the name ambiguity.

The client address data record 114 and image system address data record 148 are stored in the operations database 220 after the server 146 receives the data from the client or the sorter computers 12. These data records are transferred to the address service provider 154 for processing. For either scenario, receiving a client address data record 114 or not receiving a client address data record, the client may send additional data that is needed for complete address maintenance service. This data may include suppression data and suppression requirements plus a list of services that are authorized for the address service provider 154 to perform. The client address data record 114, in some cases, may contain only the added or deleted address records which will require sending this data and the previous client address data record to the address service provider 154 for address entry merge/purge processing.

When the address service provider 154 has completed processing of the clients address data, an address service data record 156 is created. This record contains the old address and the new address for each address that was updated plus a listing for any discrepancies that occurred during processing such as but not limited to duplicate addresses, images of mailpieces that failed to be coded and other information that may assist in address list maintenance by the client 110 or service provider 140. Once the address service data record 156 is received by the server 146 an address service data directory 222 must be generated before the client's mail can be processed. This process builds a searchable directory of address data that is compatible with the imaging system 13 and generates lexicon lists that aid in OCR recognition. Both the address service data record 156 and the address service data directory 222 are stored in the operations database 220. The address service data record 156 may be transferred to the client for maintenance of the client's customer address database 18. If the service provider 140 has been contracted to maintain the client address list, the address service data record will be processed on site and the updated client address list 116 will be forwarded back to the client. The entity responsible for maintaining the client address list may provide an ACS lookup file 123, which contains unique identifiers that can be used as a matchback reference to the customer address database entry. (see FIG. 6).

When the client mailing is run with an address service data record 156 available, the necessary data files 156, 225, 226, 123 are transferred to the sorter data file 21 for local usage during the operation of the sorter. The number of files that can be transferred in advance depends on the amount of storage available and on the advanced scheduling data available for that sorter. The operator sets up the sorting operational parameters on the user interface attached to the sorter computer 12. Refer to FIG. 3*a* for the setup procedure for both the operation with the address service data record 156 available and for operation when the image address data record 148 must be collected. Refer to FIG. 3*b* for the flow diagram associated with run time operations where mail 20 is created and sent to the postal authority 158 along with necessary documentation 150 for delivery to customers. In addition to providing the mail 20 and documentation 150 to the postal authority 158, the service provider 140 may implement work share activities necessary to receive postage discounts. Two printing requirements occur during the sorting operation. The first item is to print, with printer 14, the delivery point barcode (POSTNET) or the IMB 42, refer to FIG. 2*b* on each mailpiece that passed the address lookup requirement. A second requirement may be to print, human readable address data 43 associated with the updated address with printer 14 onto the mailpiece. This text is an abbreviated version of the address and is printed only when original address was modified by the address service provider 154. The address data may be printed directly above the barcode in the POSTNET clear zone 41.

Turning to FIG. 3*a* for a flow diagram of the setup and initial processing of mail by the service provider 140. In step 510 the client provides mail for processing along with any documentation. If a client address data record 114 is provided in advance 512 of mail processing, then this data is sent the address service provider 154 for address update processing 530 as explained in FIG. 4. In step 532, once the address service data record 156 is received back at the service provider 140 location it must be converted into a searchable address service data directory 222. This conversion is a similar to the process that is used each month to convert the national address data into the national address directory 225 for use by the imaging system 13 during reading of an address contained in a mailpiece image. In addition, an updated address list 116 may be sent to the client for address maintenance actions. This data may be in the same format as the address service data record 156 or converted to a format specified by the client. In step 535 the address service data directory 222 is transferred to the control processor 12 where it is loaded into the data file 21. The client mailing is now ready to be processed using the updated address service data directory 222 to barcode and sort the mail in accordance with FIG. 3*b*.

If the client address data record is not available 512 or was not created during an earlier processing of the same mailing 514 (i.e. last month) an imaging system address data record 148 must be created. As shown if this mailing has been processed before, steps 516, 518, 520 are bypassed. In step 516 the client's mailing is run on the sorter to collect the imaging system data record 148. This data record 148 contains the results of the address lookup for each mailpiece in the national address directory 225, results of reading the addressee name plus a delivery point ZIPCODE®. For incomplete reads or no read of the address data and name, the imaging system address data record 148 may contain a mailpiece image and a OCR ambiguity matrix as explained above. The imaging system data record 148 is sent to the address service provider 154 for address maintenance processing. The address service provider 154 will send the completed address service data record 156 back to the service provider 140 when the address maintenance is completed, step 518. The address service provider 140 will then convert the address service data record into an address service data directory 222 for the client's mailing that was processed. The address service data directory 222 will be stored in the operations database 220 until the client submits the same mailing for processing next month, step 520.

The operations of the sorter are explained next using the flow diagram of FIG. 3*b* with references to FIG. 2*a*. There are two paths as in FIG. 3*a*, one path for mailpiece processing when an address service data directory 222 is available and one for when the directory is not available. Referring to step 540, the sorting process starts with loading the mail for client (n) onto the feeder 11 and entering client data into the sorter computer 12. A client identifier may be entered to access a client data file or all the needed data may be entered through an operator terminal. Once the client and the associated mailing has been identified (i.e. airline credit cart, hotel credit card, bank statement etc.) the operations database 220 is queried to determine if an address service data directory 222 is available for this client and mailing, step 542. If the result is yes, all of the necessary data files are extracted from the operations database 220 and loaded in the sorter data files 21, step 560. These files include but are not limited to the client (n) data file, the address service data directory 222-*n*, the ACS lookup file 123-*n* if the ACS matchback option is requested and the national address directory 225, which was probably preloaded since it is typically included for sorting operations. Those skilled in the art may configure the computer processing architecture and data file storage in many formats depending on the IT resources available. For example, the files stored in the operations database may be accessed directly from the control processor 12 and not transferred. As another alternative, these same files could remain at the address service provider 154 location and accessed in real time by the control processor 12.

As shown in step 562, the document processing system operation continues by feeding the mail with the feeder 11, capturing an image of the mailpiece with the imaging system 13 and reading the printed (old) address and addressee using OCR technology and lookup of the address and addressee in the address service data directory 222. Once the old address and addressee is read, this data is used to determine if a corresponding new address is contained in the address service data directory 222. The new address data is then used to generate a postal authority delivery point barcode such as POSTNET or IMB 42. Those skilled in the art may chose to use various data record pointer/access techniques to reference a previous client address data record 114 or a previous image system address data record 148 to identify the old address data versus including that data in the address service data record 156. The barcode is then printed on the mailpiece and the mailpiece is sorted. If the address was changed, the postal authority may require that a human readable abbreviated address 42 FIG. 2*b* in the immediate vicinity of the barcode 41. In some cases the old address and addressee will be found in the address service data directory but instead of a new address being found there will be a suppression service requirement (do not mail, deceased, etc.). In this case a barcode is not printed and the mailpiece is sorted to a rejected bin.

If the old address plus addressee is not found in the address service data directory 222, the national address directory 225 will be used for lookup, step 564. The results from this lookup will be added to an ancillary image system data record, similar to image system data record 148. This record may be used to update the address service data directory 222 for the next time this mailing is processed. This process will allow the system to stay current with new customers that are added by the client.

If all the mail is not yet processed 566, steps 562 and 564 are repeating until the mailing is complete. Once the mailing is complete, step 568, the ancillary imaging system data record is compiled into an imaging system data record 148 that will be used by the address service provider to update these addresses and append them to the address service data record 156-*n*. Address and addressees that were on the suppression services list are not included in the imaging system data record 148-*n*. If additional client mailings are to be processed, the next client is selected 570 and the process is repeated.

If the client's mailing does not have an associated address service data directory 222-*n*, step 542, then the image system address data record 148-*n* must be compiled as shown in steps 544, 546, 548 and 550 of FIG. 3*b*. The first step 544 begins with feeding the mail with the feeder 11, capturing an image of the mailpiece with the imaging system 13 and determining the printed (old) address and addressee using OCR technology and lookup using the national address directory. The mailpiece is then barcoded with the delivery point barcode and sorted. Addresses that passed the national address directory lookup are stored in the ancillary image system address data record along with mailpiece images and/or OCR ambiguity matrices for mailpieces that failed lookup, step 546. This process is repeated until all the mail is processed for this client's mailing, step 548. When all the mail in the mailing has completed processing, Step 550, the image system address data record 148-*n* is compiled. If another client has mail to process 552, the steps of FIG. 3*b* are repeated.

Turning now to FIG. 4 for an exemplary flow chart of the functions preformed by the address service provider 154. The service provider 140 transfers all necessary files to the address service provider 154. These files include but are not limited to the client address data record 114, the imaging system data record 148, client configuration data that specifies address processing options to be executed, address list merge and purge data and the previously used address service data record 156 if not maintained by the address service provider 154. The processing steps are divided depending on the type of address data record that is received, step 420. For the case where a client address data record 114 is received, processing is transferred to the multiple processes that make up address maintenance services 450. If an imaging system address data record is received 148, pre-processing steps may be preformed to process images and OCR ambiguity matrices that are included in the imaging system address data record 148. When images are present 422, remote video encoding (RVE) 424 is performed to obtain the printed (old) address data and to obtain the addressee name. Computer terminal operators will key in the address and addressee data from the image and use computer assistance to identify the addressee and address. If the imaging system data record 148 contains OCR ambiguity matrices for incomplete reads, step 426, then the address service provider's processes resolve the ambiguity using enhanced processing that uses lexicons, address directories and name files that are not part of the national address directory 225, step 428. The output of steps 424 and 428 are additional addresses and addressees that can be added to the imaging system address data record 148. Other techniques can be employed by those skilled in the art which employ advanced fussy logic and artificial intelligence techniques to learn from previous encounters with the same or similar data. Once this is completed the processing is transferred to the address maintenance service 450 for processing.

The address service provider 154 has many tools and processes that can be used to address maintenance services 450. Additional services will evolve as postal authority regulations change and new processing technology becomes available. Alternate communications techniques also may be employed depending on the network connectivity and bandwidth available. The address maintenance service 450 process flow depicts 6 exemplary processes and explains the processing in a batch mode configuration, i.e. files in, files processed, files output. These same processes can be performed in real time on the mail processing equipment or in real time mode hosted from a remote site. The address maintenance service starts by performing address resolution system 300 processing to obtain a postal authority certified address (ZIP+4 delivery code) and a delivery point (street number) that passes validation against the postal authorities list of approved numbers. Refer to FIG. 5 for full description of the details in this process. Step 440 deletes duplicate addresses and name records to prevent redundant mail from being processed and merges the new address data with the pre-existing address data to account for new customers. The client may provide a list of former customers to be purged from the address list. Step 442 is similar to the delivery point verification except this process validates and corrects for errors in suite and apartment numbers and converts rural route addresses into conventional street plus number addresses. The USPS refers to these processes as SuiteLink and LacsLink respectively. Suppression services 444 prevents the sending of mail to certain addressees based on criteria provided by the client or from alternate sources. Several common examples of suppression services are mailings to a deceased person, mailings to persons on the Direct Marketing Association (DMA) mail preference list or mailings to a prison, PO Box or college dormitory. Suppression service mail will generally be rejected from the mailing when encountered on a document processing system. Move update processing is performed in step 446 to eliminate mailing of material to a former address for a given addressee. Correction of addresses for moves is mandated by many postal authorities since the cost to forward mail is significant. The postal authority provides a data record of move data on a periodic basis, which is referred to as the national change of address (NCOA) file by USPS. This data is allowed to be greater than 90 days old hence many addresses may not be forwarded as required. Step 400 provides additional move update accuracy and currency by utilizing the address charge service (ACS). Mail that is processed by the postal authority is processed using various systems such as Postal Automated Redirection System (PARS) and the Computer Forwarding System (CFS) to correct address for move updates using data that is less than a week old. The address maintenance service 450 will use the ACS data record 64 for each client's mailer ID to further update the move data. The ACS data record will come directly to the address service provider 154 from the postal authority 158 either directly or routed through the client or service provider 140. Refer to the discussion associated with FIG. 6 for additional details on the ACS service. The output from the address maintenance service 450 is the address service data record 156*a* as described above plus a file of address service data discrepancies 156*b*. The address service data discrepancies 156*b* may contain but is not limited to suppressed addresses, images of mailpieces or addresses that could not be processed and purged data. Both files are sent to the service provider 140 for processing and for forwarding to the client if requested.

FIG. 5 is an exemplary flowchart depicting an address resolution system 300 comprising an address resolver and a point resolver which make up the address resolution system 300. Another example of a system for resolving address quality issues that impede the effectiveness of mail piece delivery is described in copending U.S. patent application Ser. No. 11/892,581 filed by Wayne Orbke, entitled "Method And System For Performing Address Resolution Processing" and filed on Aug. 24, 2007, is incorporated by reference in its entirety. The process starts with client address data 114 that is parsed and one address at a time is fed into ZIP+4 certifier 220 and a delivery point verifier (DPV) 230 if the certifier certified the ZIP+4 222. These two processes have two distinct output paths which flow into the address quality processor 240. The first path is Failed Certified 224, which input addresses that failed certification by Certifier 220. In contrast, Failed Verified 234 input addresses that were certified by Certifier 220, were transmitted to Verifier 230 via path Certified 222, and then failed verification by Verifier 230.

For example, the input address (Lewis Latimer, 3501 Devonshire, Germantown, Tenn. 38139) may contain the following address elements: name Lewis Latimer, primary address number 3501, street name Devonshire, city Germantown, state Tennessee, and 5 digit ZIP Code 38139. Two distinct error resolution paths may be pursued by processor 240 depending on which type of failure occurs.

Processor 240 comprises three major modules: a first module labeled Address Resolver 340, a second module labeled Point Resolver 310, and Selection Processor 350. Processor 240 also comprises minor modules: Verifier-B 320, Verifier-C 360, Address Certified 330.

The Address Certified Module 330 determines whether an address has previously passed through Address Resolver 340. The circled A at the bottom right indicates that path No 334 loops to the top of Address Resolver 340. If the address is certified 330 (yes 332) and has filed DPV, no additional processing is possible. This address is added to the list of bad addresses 380.

Update History File 370 uses a resolved (or corrected) address that has been verified and associates the verified address with the initial input address in a history file or database for use with History Matcher-A 312 and/or History Matcher-B 341. The history matcher modules may be a single module, or may be two distinct modules. If two distinct history matcher modules are used, it may be convenient to share a single history file database. Update History File 370 may be built into a History Matcher module, but it is convenient to show Update History File 370 outside of Processor 240 in order to indicate that processing by the Processor 240 is effectively finished.

Compiler 390 compiles verified input addresses from path Verified 232 and verified resolved addresses from path Verified 372. Compiler 390 outputs Output Mailing List 304 which will be integrated into the address service data record 156. The Compiler 390 may output an associated confidence level with each address. For example, resolved addresses from path Failed Certified 224 may have a different confidence level than from Failed Verified 234. Additionally, or alternatively, Address Resolver 340 or Selection Processor 350 or Point Resolver 310 may assign confidence values. Distinct confidence levels may receive distinct discounts from a postal authority based on predictive or historic levels of successful delivery. Additionally, third parties users may wish to send expensive color brochures to high confidence resolved addresses, in contrast to black and white brochures to low confidence resolved addresses. In other words, a confidence value associated with an address is valuable data which may be used or sold.

Address Resolver 340 may comprise multiple modules such as History Matcher-B 341, Name/Address Checker 342, Street Name Transposer 343, and Expanded Searcher 344. These multiple modules may be operated in series or on parallel. Address Resolver 340 receives Failed Certified 224, and outputs via path 348 to Selection Processor 350. Address Resolver 340 may also receive input 349 from Selection Processor 350 if a sufficient confidence value was not received from the process that obtained an address resolution 341, 342, 343 or 344. If a certified address can not be determined 351 this data is sent to the bad address compiler 380 where it is complied with address that failed 332 the address certifier 330. This list will be provide to the client or processed by the Address Service Provider (AS Provider) 154 to purge these addresses from the address list.

Point Resolver 310 may comprise multiple modules such as History Matcher-A, Primary Number Transposer 314, Secondary Number 318, and Discrepancy Fixer 318. Primary Number Transposer 314, Secondary Number 318, and Street Name Transposer 343 (from Address Resolver 340) may be portions of a single large Transposer module (not shown), or alternatively may share sub-modules (e.g. a sub-module for transposing digits of three digit numbers). Point Resolver 310 receives Failed Verified 234, and outputs Modified Data 319. Point Resolver also receives Not Verified 364 from Verifier-C 360. Addresses from the address resolver 340 that fail verifier-C 360 also must pass the point resolver 310 before they are verified as good 322.

Point Resolver 310 is configured to perform relatively quick and easy resolutions to Failed Verified 234, because input address in path Failed Verified 234 have already been certified by Certifier 220, and thus may be relatively high quality input addresses with relatively minor errors. Addresses that fail the verifier-B 320 but have not been through the address resolver 340 are transferred to that module via path A 334.

FIG. 6 illustrates exemplary system components and processes to enable a sorter or other suitable document processing systems to print 14 the IMB 42 on one or more mail pieces of a mailing. Another example of techniques and equipment for allowing placement of a postal approved barcode on a mailpiece is described in copending U.S. patent application Ser. No. 11/848,136 filed by Wayne H. Orbke et al, entitled "Mail Processing System For Address Change Service" and filed on Aug. 30, 2007, is incorporated by reference in its entirety. The printed IMB 42 may indicate the selection of the ACS service, and may also include other data related to the mail piece, such as the mailer, additional services selected, or the delivery point address, or any suitable combination thereof, or any other suitable information related to the delivery or processing of a mail piece.

As illustrated in FIG. 6, components may include, for example, mail to be processed 112 and one or more sorters 142, 144. Sorters 142, 144 may produce IMB coded mail 20 for delivery by the postal authority. IMB coded mail 20 may preferably have ACS service requested within the IMB code, and may also include, for example, a mailer identifier number, a delivery point address code (e.g., a ZIP® code or other suitable code, etc.), or a unique identifier (e.g., a match back code for accessing an address record in an address list, a unique number defining a uniqueness of a mail piece for a predetermined period of time, or any other suitable identifiers as discussed herein), or any combination thereof.

Systems and processes for address correction feedback 400 are also illustrated in FIG. 6, and include postal sorters 24 or Computer Forwarding Systems (CFS) 27 to process the mail and return move update data (e.g., revised address data for an addressee from a previous address to a new address, and may include additional information related to the address, or addressee) to a national customer support center (NCSC) 30. An address change service data record may be sent from the national customer support center 30 to a data center processor 33 located at the service provider 140 or at the address service provider 154. Data center processor 33 may be communicatively coupled to the customer address database 18 controlled by client 110 FIG. 1, and may accordingly update address data for one or more addressees using the address change service data 64 received from the nation customer support center 30

FIG. 6 also illustrates the process of printing an IMB on one or more mail pieces 112. The process may be for mail pieces 112 that do not have a printed IMB, or that have an address block IMB to be updated with additional parameters. The IMB may be printed, for example, in the clear zone on the lower right corner of the mail piece 112. In the exemplary process, ACS has been selected by the mailer so as to be compliant with move update requirements for mail that is submitted for and is qualified to receive postage discounts, from, for example, the United States Postal Service (USPS) or any other suitable postal authority. The one or more mail pieces 112 that makeup the mailing may be created in a mail factory 17 by the client 110 or service provider 140. Mail factory 17 may format, print and insert one or more documents into envelopes to form mail pieces 112. The mail factory 17 can be configured in numerous ways and may be one company or several companies. A distributed form of mail factory operations entails a client providing an address list and print file to a print shop that prints the documents, as well as inserts. The documents and inserts are then provided to a letter shop (service provider) that inserts the documents and inserts into an envelope to create a mail piece. The letter shop then provides the finished mail pieces to a presort company to sort the mail in accordance with postal authority standards and print an IMB on the envelope. Any combination or grouping of these functions may occur in the mail production business.

The one or more mail pieces 112 of a mailing are processed by sorter(s) 142, 144. Sorter(s) 142, 144 may be any suitable mail piece sorter or other document processing system. The sorter 142 may be comprised of a feeder 11, that singularizes a plurality of mail pieces (e.g., in a stack formation) into individual mail pieces in the transport of sorter 142. Sorter 142 may also include an imaging system 13 that may utilize optical character recognition (OCR) or other suitable techniques for capturing address information, addressee information, or other suitable information from the mail pieces. Sorter 142 may also include a printer 14 which may print machine-readable codes (e.g., barcodes, etc.) indicating, e.g., service type, mailer identifier, unique identifiers, or delivery point address codes, or any other suitable information onto the mail pieces. Sorter(s) 142, 144 may also include sort bins 15 to collect mail pieces in accordance with postal authority presort rules for grouping mail pieces (e.g., by delivery point address code or by any other suitable grouping).

The sorter(s) 142, 144 may further include one or more processors 12, which may be configured to control, e.g., control feeder 11, imaging system 13, barcode printer 14, etc. Processor(s) 12 may also provide an operator interface (e.g., to a display screen to an operator of sorter 10), processing of OCR data or other related data from imaging system 13, and perform address or addressee lookup from one or more address databases or data files. Processors 12 may also be configured to control printing (e.g., control printer 14 for printing IMB 42 codes on one or more mail pieces) and operations of sort bin 15. Sorter 142 may optionally include a machine code verifier (e.g., barcode verifier, etc.) to verify the accuracy and quality of the printed output of the machine readable code on the one or more mail pieces. The sorter 142 can have one or more computing devices which make up the control processor 12 that are used for run time machine control, sort and printing control, barcode reading, multiple image processing, address processing, move update, cursive recognition and any other functions for sorter and peripheral equipment operation.

The output of the sorter 142 may be one or more mail pieces of a mailing that have a valid IMB 42 printed on the front of the envelope 20. The valid IMB may be printed within an address block on an envelope or located in a clear zone in the lower right section of the envelope 20.

The IMB may be generated by mail sorter 142 (e.g., by processor 12) by capturing addressee and address data using imaging system 13. Additionally, the IMB 42 may be generated by utilizing data entered into the processor 12 by, for example, an operator of sorter 142, or retrieved from one or more data files stored on one or more digital storage devices 21 communicatively coupled to control processor 12.

In a multiple sorter environment, at least some of the data for generating the IMB may be transferred from one or more servers 146 or digital storage devices 220 communicatively coupled to a plurality of sorters for processing the mailing.

IMB data structure 42 is illustrated in FIG. 7. The first data field 44 is a barcode identifier, which may be, for example, two digits or more in length. The field 44 is reserved for future use by the postal authority. The second data field 46 may be, for example, three or more digits in length or any other suitable length, and may be used to identify whether ACS address service is requested, or whether ACS address service and Confirm is requested. For example, the digits 080 may be used to identify a request for ACS and the digits 140 may be used to identify the request for combined service of ACS and Confirm. Confirm is the USPS service that is used to track a mail piece through the postal network and confirm its delivery. The third exemplary data field 48 may indicate a mailer identifier number ("Mailer ID"). The third data field 48 may be, for example, six digits in length or any other suitable length. The Mailer ID may be assigned to the participant which is usually the client or service provider 140; although an address service provider 154 could be designated. The participant may request multiple Mailer IDs to correlate with different customer address lists. The Mailer ID relates to the business entity that will receive the address correction data from USPS and any fees associated with the service.

The fourth data field 50 of exemplary IMB data structure 42, may be, for example, nine digits in length or any other suitable length, and is reserved for the participant to specify. For example, if the confirm service and ACS are selected, this field may contain a unique number which remains unique for a specified period of time which is substantially long enough to ensure no ambiguous tracking results can occur because two mail pieces with the same Mailer ID and identification number are in the postal network at the same time. The unique number may contain match back data or reference match back data provided the uniqueness requirement is met. If ACS is selected, the fourth data field 50 can be allocated for a match back code that is used to efficiently access the correct address data record in the client's address list. Use of a match back code may enable cost effective address and addressee record updating. The match back code may also serve as a unique identification number, thus allowing for both Confirm and ACS with match back. The fifth data field 52 may be, for example, reserved for the delivery point address code 52 (e.g., ZIP code) which can be 0, 5, 9 or 11 digits in length, or any other suitable number of digits to identify a delivery point address code.

Alternative versions of the data assignments for the IMB data fields will evolve as postal authority requirements change. For example, the digit allocations may be adjusted between Mailer ID (e.g., third data field 48) and unique identifier (e.g., match back code, unique number, or other participant-reserved code for fourth data field 50). Also, for example a sorter identification code (i.e., sorter ID) field may be added to identify an entity performing the printing and/or sorting of mail pieces. Additionally, the length of one or more fields (e.g., fields 44, 46, 48, 50 52) may be increased or decreased as needed, and the number of fields in the IMB may also be increased or decreased. For example, to accommodate an increase in the number of fields or in the length of one or more fields, the length of the IMB machine readable code (i.e., barcode) may be extended, or a higher density barcode may also be used. The match back process is enabled by using one or more of the fields within the IMB as appropriate.

The Mailer ID (e.g., which may be indicated in third data field 48 of the IMB) is a component of the ACS process. The Mailer ID is obtained before the one or more mail pieces associated with a mailing are processed on a sorter (e.g., sorter 142 of FIG. 1). The Mailer ID may be obtained by a business entity (e.g., client 110, 120, 130, service provider 140, or an address service provider 154 or any other suitable entity). The business entity registers and obtains a Mailer ID from the National Customer Support Center (NCSC) (e.g., National Customer Support Center 30, illustrated in FIG. 6) prior to processing an ACS mailing. The Mailer ID may be made available to the control processor 12 either through operator entry, transfer of data from one or more servers 146 or digital storage devices 220, or through the selection of a predefined mailing job description that contains data related to process a mailing.

The match back code or unique identifier are components of the ACS since the service is only effective if the participant updates their address lists when move data is returned from the NCSC 30. The address update process 32 utilizes the Address Change Service data record 64 returned from the NCSC 30 to perform the address update in the customer address database 18.

One option for the customer address database 18 update is to use the fourth data field 50 (as shown in FIG. 7) of the IMB 42 for a match back code. This code may be, for example, designed by the address list data administrator to facilitate the automated update or computer assisted update of the customer address file, which is one entry in the customer address database 18, associated with the move. The match back code may enable increased accuracy and increased speed in accessing the correct customer address file within the address list. The client 110, service provider 140, or address service provider 154 may determine how the match back code is generated depending on the data structure of the customer address database 18 and the structure of the customer address file and the database software. Numerous alternatives exist for generating the matchback code including creation of the code from the imaged address or by using data files referenced using the address data captured from the mail piece. The code must be consistent with the ACS or ACS plus confirm requirements.

An alternative approach, when Confirm and ACS services are both selected, is to generate a unique identifier which is stored in the ACS lookup files 123 on at least one digital storage device 21 communicatively coupled to processor 12 that contains a unique identifier for each customer address file, which meets USPS standards for the uniqueness period (e.g., 45 days or any other suitable period of time) and contains match back data. The unique identifier which is stored in the ACS lookup file 123 is created in the data center processor 33 from a combination of customer address database 18 features such as data record pointers, address contents, account information, random number and other parameters that can be combined with an algorithm such as a hash code algorithm to produce a unique identifier number 50 (as shown in FIG. 7). This unique identifier number 50 may be decoded during the address update process at block 32 to locate the same address record in the customer address database 18 that was used to create the unique identifier. An alternative to using a hash algorithm to combine data, as explained above, into a unique match back code is to create a unique number that will not be repeated for a predefined period of time determined by the postal authority. The unique number may be a sequence number provided the sequence number can have a sufficient range to be unique for the period required by the postal authority. The unique number is cross-referenced to a match back code for the specific customer address file being processed on the sorter 142 so that the match back code can be obtained when the unique number 65 (as shown in FIG. 7) is returned from NCSC 30 by using the cross reference. The processor 12 of sorter 142 may access the data files 21 to obtain the correct unique identifier based on the address block data returned from the imaging system 13 that may utilize optical character recognition (OCR) or other suitable techniques for obtaining address information from scanned address data on a mail piece. The unique identifier may then be encoded into the IMB (e.g., in fourth data field 50 of IMB 42 shown in FIG. 7). This unique identifier may be used to access the address data file that requires a move update when the ACS data record is received from NCSC 30 shown in FIG. 6. In the case where either the match back code or unique identifier cannot be determined and added to the IMB, the Confirm and ACS services as described herein may not be available because of the lack of a unique identifier or match back code.

Referring again to FIG. 6, the output of sorter 142 is one or more mail pieces 20 that have a valid IMB 42 printed on them with the ACS or ACS+confirm selected, a Mailer ID, a delivery point address code, and a unique identifier or match back code 50. The one or more mail pieces 20 are then delivered to the postal authority for processing, such as on mail piece sorter 24. The postal authority may use other mail processing equipment for the ACS operation such as an Advance Facer Canceller System (AFCS), an inserter equipped with an imaging system 13 and printer or any other suitable document processing system. On the first observation of the mail piece, the IMB may be read by a barcode reader 25, or, alternately, may have been read by a barcode read module or other machine readable code reader which is incorporated into the imaging system 23. The delivery point address code may be decoded and evaluated along with the addressee name which is read by imaging system 23 to determine if that individual or firm has moved. The sorter system 24 updates the address delivery point address code using the postal authority move update system and updates the IMB on the mail piece. The ACS processing system 28, which is communicatively coupled to mail sorter 24, may compile a list of move updates for each move returned by postal authority move update system and forward this data along with the IMB data to the National Customer Support Center (NCSC) 30 for creation of the data to be returned to the participant. Some of the mail pieces may encounter a processing error in postal authority move update system and be diverted to a reject bin allocated from the sort bins 26 on the postal authority sorter 24 for additional processing on the Computer Forwarding System (CFS) 27. A typical processing error may be the recognition that a move has occurred at the delivery point address code but the OCR by imaging system 23 could not correctly read the addressee from the mail piece. The CFS 27 allows an operator to view the address data and to retrieve a correct move update from the postal authority national change of address file. The CFS 27 may also generate a list of move updates and forward the data to the NCSC 30.

The NCSC 30 is communicatively coupled to the move update processing systems, such as sorters 24, CFS 27, or other systems. The data associated with a move (as sent to the NCSC 30 via the CFS 27 and the postal authority sorters 24) is transferred on a periodic basis. For example, Address Change Service Data Records 64 may include, but is not limited to, the following data: Mailer ID, matchback code data, addressee name, old (i.e., previous) address data, new (i.e., present) address data, move type data (family move, individual move, etc.), or effective move date, or any combination thereof, or any other suitable data. The NCSC (e.g., NCSC 30 shown in FIG. 6) will compile the move update data for each Mailer ID over a predetermined period of time and make this data available to the participant (e.g., as an electronic file, via a web interface, or as a printout, or by having the data available by any other suitable means). The data returned to the participant may include the Mailer ID, unique identifier (e.g., generated match back code, unique number or match back code obtained from the ACS lookup file 123), name for addressee, old address, new address, move type—family/individual, or move effective date—month and year, or any combination thereof.

The ACS data record from NCSC 30 is processed by the business entity 32 (e.g. client, service provider, or a Address service provider 154). The ACS data record 64 is sent to the registered participant (the business entity that requested the mailer ID at block 34) who may forward the ACS data record 64 to the organization responsible to update the customer address files in the customer address database 18. These updates, as described above, may be automatic (e.g., using various database update techniques) or may be semi-automatic such as with computer assisted manual updates. The net result is an updated address list that will be used next time mail is produced to minimize or avoid the need for ACS and facilitate the efficient delivery of mail by USPS.

The operation of the address services using an inserter for the document processing system is illustrated in FIG. 8. Since the functional flow and the processes shown and implemented are nearly the same for a sorter 142 or an inserter 800 the full description is not repeated. The output product is the same for either solution, i.e. mail 20 that is compliant with postal authority regulations. On the input, sorters start with unsorted mailpieces while inserters start with documents 805 in various forms that will be inserted into an envelope and provided to the postal authority 158. The documents 805 may be provided by the client or printed from a print file by the service provider 140. There is an option to use the imaging system 13-1, which is located on the document input section 810, which prepares the document for insertion into and envelope, to image the address and addressee and to read the address and addressee with OCR and directory lookup processes. Alternately, the mailpiece can be imaged after the envelope inserter 818 using the mailpiece imaging system 13-2. Either imaging system can produce the image system address data record 148. If the client 130 provided the client address data record 114 it will be forwarded to the address service provider 154 for processing. The address service provider 154 will return the address service data record 156 to the server where it is converted into an address service data directory 222 to be used in conjunction with the imaging system.

A server 146 is used in the same capacity as for the sorter operations. The server manages the operations database 220 and communicates with the clients, address service provider 154, postal authority 158 and the inserter control processor(s) 12*s*. The server 146 has an operator interface 152 to enable data entry and system management. The inserter control processor 12*s* controls each section of the inserter including the imaging system. The exemplary processing steps are as follows for the case when the address service data directory 222 is available during processing. Documents 805 are loaded on the input section 810. The document imaging system 13-1 reads the address and addressee data from the document and looks up the address and addressee in the address service data directory 222 to find the new address or the suppression services result. If a new address is found the correct barcode 42 FIG. 2*b* and human readable address 43 will be printed by the barcode and text printer 820 when the completed envelope arrives at this location. The postage meter 822 also includes a printer and is an alternate method of printing the barcode and text. Various printer technologies may be used for printing 829, 14. These include but are not limited to ink jet printers, bubble jet printers or postage meter printers. The mailpiece imaging system 13-2 is an alternate location for reading the address and addressee data. This location is mandatory if the address and addressee were printed on the envelope as part of the output from the envelope inserter 818. This location 13-2 has a disadvantage since there is less time available to read the address and addressee and lookup the new address before the mailpiece reaches the printer 820. As a result the processors will have to have higher performance level to meet the short time available for image processing. Mailpieces that are on the suppression list will be rejected 832 along with mailpieces that failed to get a compliant lookup in the address service data directory 222. The postage meter 822 will be disabled for suppression mailpieces. Mailpieces that are forwarded due to a move also may have to be rejected 823 since they no longer comply the presort requirements for postage discounts. These mailpieces will have to manually inserted into the correct mail tray. Properly processed mailpieces 20 will be stacked in the envelope stacker for traying and delivery to the postal authority 158 along with the documentation 150.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for updating address data for a plurality of mailpieces processed by a document sorting system prior to delivery by a postal authority, the method comprising steps of:

providing a client address list electronically to a service provider, the client address list not being supplied by the postal authority;

forwarding the client address list from the service provider to an address service provider, the client address list being associated with the plurality of mailpieces to be processed on the document sorting system;

updating at least some of the address data contained in the client address list for compliance with one or more regulations of the postal authority or any requirement of the client;

converting the updated address list into a directory format required by an imaging system associated with the document sorting system and transmitting a client address service data directory to the service provider;

storing the client address service data directory, associated with the plurality of mailpieces to be processed by the document sorting system;

processing the plurality of mailpieces on the document sorting system;

capturing an image of an address positioned on each mailpiece by the imaging system;

comparing address information from the captured images of the mailpieces with the stored client address service data directory, which is not a directory based on data supplied by the postal authority; and for one or more of the plurality of mailpieces, printing corrected delivery information based on the comparison step, wherein the delivery information is printed as a postal authority approved barcode on the one or more of the mailpieces, to form one or more postal authority approved mailpieces.

2. The method of claim 1, where the barcode contains delivery point information.

3. The method of claim 2, wherein the barcode further contains one or more of the following: address change service request, confirmation request, unique identifier and matchback code.

4. The method of claim 1, wherein the processing step includes processing the mailpieces on the document sorting system selected from a mail sorter.

5. The method according to claim 1, wherein the printing step includes applying readable text on each mailpiece requiring an address update as indicated by the comparing of information to updated client address data.

6. The method of claim 1, where the updating step includes updating address information selected from one or more of the following: move update information, address resolution of undeliverable as addressed addresses, delivery point updates, suppression service information, and address list merge and purge data.

7. The method of claim 1, further comprising:

capturing address data from each of a plurality of mailpieces processed on the document sorting system by the image system; and generating the client address list based on the captured address data.

8. A system for updating address data for a plurality of mailpieces, the system comprising:

a client address list including address data associated with each mailpiece, the client address list not being supplied by a postal authority;

an address maintenance service adapted to: receive the client address list, update the address data contained in the client address list, and store the updated address list into a directory format required for an image capturing system;

a document sorting system including the image capturing system, the image capturing system capable of:

capturing information from an image of an address positioned on each mailpiece processed by the document sorting system; and comparing the address data derived by the imaging system from a captured image of each mailpiece with any corresponding updated client address data contained in the stored client address service data directory received from the address maintenance service; and a printer adapted to print address delivery information on each mailpiece and corrected address data for one or more addresses requiring an update as indicated by the comparing step, wherein:

the client address list is generated by capturing an image of the address data positioned on each mailpiece by way of the document sorting system, the client address list is derived from a prior processing of a mailing of the client, and the printer is adapted to print a postal authority approved barcode on each mailpiece requiring an address update.

9. The system according to claim 8, wherein the document sorting system includes a mail sorter.

10. The system according to claim 8, wherein the printer is adapted to print readable text on each mailpiece requiring an address update as indicated by the comparing of information to updated client address data.

11. The system according to claim 8, wherein the barcode contains delivery point information.

12. A method for updating address data for a plurality of mailpieces processed by a document sorting system prior to delivery by a postal authority, the method comprising steps of:

storing an updated client address contained in a client address service data directory onto the document sorting system;

processing the mailpieces on the document sorting system;

capturing an image of an address positioned on each mailpiece by an image capturing system associated with the document sorting system;

comparing address information from the captured image of each mailpiece with the stored updated client address service data directory which is not supplied by the postal authority; and printing delivery information approved by the postal authority on mailpieces and printing human readable address information for addresses requiring an address update as indicated by the comparing step, wherein the printing step include applying a barcode approved by the postal authority on mailpieces requiring an address update as indicated by the comparing step.

13. The method of claim 12, wherein the barcode contains delivery point information.

14. The method of claim 13, wherein the barcode further contains one or more of the following: address change service request, confirmation request, unique identifier and matchback code.

15. The method of claim 12, wherein the printing step include applying readable text on mailpieces requiring an address update as indicated by the comparing of information to updated client address data.

16. The method of claim 12, wherein the processing step includes processing the mailpieces on the document sorting system selected from a mail sorter.

17. A system for updating address data for a plurality of mailpieces, the system comprising:

a document sorting system including an image capturing system;

an address maintenance service adapted to: receive a client address list, update the address data contained in the client address list, and store the updated client address list into a directory format required by the image capturing system, wherein the image capturing system is capable of:

capturing an image of an address positioned on each mailpiece processed by the document sorting system; and comparing, by the document sorting system, the captured image of each mailpiece with any corresponding updated client address data contained in the stored updated client address directory, received from the address maintenance service and not a directory based on data supplied by the postal authority; and a printer adapted to print corrected address delivery information on each mailpiece and printing address information for addresses requiring an address update as indicated by the comparing of information to updated client address service data directory and not based on address data supplied by the postal authority, wherein the printer is adapted to print a barcode on each mailpiece requiring an address update as indicated by the comparing step.

18. The system according to claim 17, wherein the document sorting system further includes a mail sorter.

19. The system according to claim 17, wherein the barcode contains delivery point information.

20. The system according to claim 19, wherein barcode further contains and one or more of the following: address change service request, confirmation request, unique identifier and matchback code.

21. The system according to claim 17, wherein the printer is adapted to print readable text on each mailpiece requiring an address update as indicated by the comparing of information to updated client address data.

* * * * *